US012803691B2

(12) United States Patent
Wang et al.

(10) Patent No.: US 12,803,691 B2
(45) Date of Patent: Nov. 17, 2026

(54) METHOD FOR PREDICTING CHANNEL BASED ON IMAGE PROCESSING AND MACHINE LEARNING

(71) Applicants: Southeast University, Nanjing (CN); PURPLE MOUNTAIN LABORATORIES, Nanjing (CN)

(72) Inventors: Chengxiang Wang, Nanjing (CN); Tong Wu, Nanjing (CN); Junling Li, Nanjing (CN); Chen Huang, Nanjing (CN)

(73) Assignees: Southeast University, Nanjing (CN); PURPLE MOUNTAIN LABORATORIES, Nanjing (CN)

( * ) Notice: Subject to any disclaimer, the term of this patent is extended or adjusted under 35 U.S.C. 154(b) by 198 days.

(21) Appl. No.: 18/815,320

(22) Filed: Aug. 26, 2024

(65) Prior Publication Data

US 2025/0078442 A1 Mar. 6, 2025

(30) Foreign Application Priority Data

Aug. 28, 2023 (CN) ......................... 202311096516.6

(51) Int. Cl.
*H04B 17/391* (2015.01)
*G06V 10/26* (2022.01)
(Continued)

(52) U.S. Cl.
CPC ......... *H04B 17/3913* (2015.01); *G06V 10/26* (2022.01); *G06V 10/764* (2022.01);
(Continued)

(58) Field of Classification Search
CPC .. H04B 17/3913; G06V 10/26; G06V 10/764; G06V 10/774; G06V 10/82;
(Continued)

(56) References Cited

U.S. PATENT DOCUMENTS

| | | | | |
|---|---|---|---|---|
| 12,346,640 B2 * | 7/2025 | Zhang | ..................... | G06F 30/20 |
| 2019/0094196 A1 * | 3/2019 | Park | ...................... | H04W 16/22 |

(Continued)

FOREIGN PATENT DOCUMENTS

| | | | |
|---|---|---|---|
| CN | 111222223 B * 12/2021 | | |
| EP | 4106216 A1 * 12/2022 | ............ | H04B 7/088 |

(Continued)

*Primary Examiner* — John R Schnurr
(74) *Attorney, Agent, or Firm* — MUNCY, GEISSLER, OLDS & LOWE, P.C.

(57) ABSTRACT

A method for predicting a channel based on an image processing and a machine learning, which belongs to the field of the channel prediction introduces an image semantic segmentation technology to identify and segment a scatterer in a scenario image, extracts the effective position information of the scatterer, and identify a scenario in the segmented image. The subsequent feature extraction is performed in a similar scenario through the scenario identification, which facilitates extracting the more tiny environment features. The semantic segmentation images of the known scenarios are jointly input into a feature extraction and channel prediction network to complete the channel prediction. Therefore, the environment information can be input more flexibly through the semantic segmentation technology, so that the accuracy of the model is improved, and the precision higher than that of a traditional channel model is finally obtained.

6 Claims, 6 Drawing Sheets

(51) Int. Cl.

| | |
|---|---|
| ***G06V 10/764*** | (2022.01) |
| ***G06V 10/774*** | (2022.01) |
| ***G06V 10/82*** | (2022.01) |
| ***G06V 20/00*** | (2022.01) |
| ***H04L 25/02*** | (2006.01) |

(52) U.S. Cl.
CPC ............ *G06V 10/774* (2022.01); *G06V 10/82* (2022.01); *G06V 20/35* (2022.01); *H04L 25/0254* (2013.01)

(58) Field of Classification Search
CPC .... G06V 20/35; G06V 20/70; H04L 25/0254; G06N 3/0455; G06N 3/0464; G06N 20/00

See application file for complete search history.

(56) References Cited

U.S. PATENT DOCUMENTS

| | | | | |
|---|---|---|---|---|
| 2020/0311985 | A1* | 10/2020 | Jeong | G06T 11/00 |
| 2021/0044988 | A1* | 2/2021 | Park | H04W 16/18 |
| 2021/0082201 | A1* | 3/2021 | Chopra | G06T 11/26 |
| 2023/0007564 | A1* | 1/2023 | Balasubramanian | H04B 17/373 |
| 2023/0124275 | A1* | 4/2023 | Pfadler | H04L 25/0222 370/252 |
| 2023/0217260 | A1* | 7/2023 | Khomenko | B64C 39/024 455/446 |
| 2024/0430709 | A1* | 12/2024 | Khomenko | G06V 20/70 |
| 2026/0073631 | A1* | 3/2026 | Yang | G06T 17/00 |

FOREIGN PATENT DOCUMENTS

| | | | | |
|---|---|---|---|---|
| WO | WO-2024000036 A1 | * | 1/2024 | H04W 16/18 |
| WO | WO-2026055350 A1 | * | 3/2026 | H04B 17/318 |

* cited by examiner

METHOD FOR PREDICTING CHANNEL BASED ON IMAGE PROCESSING AND MACHINE LEARNING

TECHNICAL FIELD

The present disclosure relates to the technical field of the channel prediction, and in particular to a method for predicting a channel based on an image processing and a machine learning.

BACKGROUND

In the future, 6G wireless communication technology will achieve the full coverage, the full spectra, the full application, and the strong security. The analysis on the wireless channel characteristics and the modeling are the basis for the design, the performance evaluation, the optimization and the deployment of the communication systems. However, the channel sounders with high-performance are expensive, the measurement process is time-consuming and labor-intensive, and channel sounders with high-performance can never exhaust channels in all frequency bands and all scenarios. In addition, the channel measurements cannot even be performed on some extreme scenarios. Therefore, it is urgent to learn from the existing channel characteristics to better predict the channel characteristics of the unknown scenarios and reduce the measurement costs.

The existing channel modeling mainly focuses on the deterministic modeling and statistical modeling, such as the channel modeling based on the channel measurements, the deterministic channel modeling based on the ray tracing, and the geometric random channel modeling. None of the above-mentioned existing models can predict the channel characteristics of the unknown scenarios, and due to the lack of the prior knowledge on the current environment, the channel modeling merely relies on parts of physical parameters, and ignores the environmental information, which cannot be changed with the real-time environmental. Meanwhile, the traditional channel measurements and the modeling still have long-standing problems, such as the high costs of the channel sounders with high-performance as well as the time-consuming and labor-intensive measurement process, and the channel measurements cannot even be performed in some extreme situations. Therefore, only parts of channel characteristics of the known frequency bands and scenarios can be analyzed, the complex relationship between the new channel characteristics and the frequency bands/scenarios cannot be fully explored. In order to address these limitations, the research on the channel has gradually evolved from the simple statistical channel modeling to more flexible and accurate prediction channel modeling driven by the large amounts of data. In this regard, in the light of the rapid development and the tremendous success on artificial intelligence (AI) in many filed such as the image processing, computer vision, and the data mining over the past decade, AI is expected to serve as an auxiliary tool. The channel prediction performed by AI has received increasing attention from the researchers in the communication field. The prediction channel modeling based on the spatial domain allows deep exploration of the relationship between channel characteristics and physical parameters.

However, nowadays, the spatial domain prediction channel modeling is mostly limited to the site values and ignores that the scenario pictures themselves include a lot of information. As the factors affecting the channel are constantly being mined, parameter acquisition has become a major puzzle. Therefore, the image processing technology having more flexibility and maneuverability is required to mine more information from the images to implement the more accurate time/space channel prediction.

From the current research on the prediction channel modeling based on the images, although the prediction channel modeling based on the images achieves the better prediction results than the traditional prediction channel modeling, it is still limited by the physical parameters and merely uses the images as an auxiliary prediction tool. Furthermore, these models cannot illustrate that how the images affect the channel predictions, therefore, the interpretabilities of these models are required to be further explored. In contrast, the image processing can reduce this dependence to a certain extent and further extract the factors that affect the channel in the image.

SUMMARY

A method for predicting a channel based on an image processing and a machine learning is provided in the present disclosure, which solves the technical problems of the high costs and the difficulty of the channel measurements and difficulty in obtaining parameters for the traditional channel modeling.

A method for predicting a channel based on an image processing and a machine learning is provided by an embodiment of the present disclosure, the method comprises the following steps.

Scenario pictures of the channel to be predicted are acquired.

The scenario pictures are inputted into a pre-trained semantic segmentation model to obtain segmented scenario pictures.

The segmented scenario pictures are inputted into a pre-trained scenario recognition model to obtain a scenario classification result for the segmented scenario pictures.

The channel is predicted through inputting the segmented scenario pictures into a pre-trained feature extraction and prediction network to obtain a channel prediction result for the scenario pictures of the channel to be predicted according to the scenario classification result.

In one embodiment of the present disclosure, further provided is the following steps.

Channel measurement data and scenario pictures of existing frequency bands and scenarios are acquired, and a training database for multi-frequency bands and multi-scenarios is constructed.

The scenario pictures are annotated in the training data base according to categories of scatterers in the channel to obtain a semantic segmentation data set, and a pre-constructed semantic segmentation neural network is trained by utilizing the semantic segmentation data set to obtain a trained semantic segmentation model.

In one embodiment of the present disclosure, the training the pre-constructed semantic segmentation neural network by utilizing the semantic segmentation data set to obtain the trained semantic segmentation model includes following steps.

A feature map is dilated from shallow to deep by utilizing a MobileNet V2 as a backbone network of an encoder.

A DeepLabV3+ semantic segmentation neural network based on the MobileNetV2 backbone network is constructed, atrous convolutional layers with different dilation rates are selected to extract features of different scales.

The semantic segmentation neural network is trained through the semantic segmentation data set to obtain the trained semantic segmentation model.

In one embodiment of the present disclosure, in the trained semantic segmentation model, the segmentation accuracy of the semantic segmentation model is evaluated by a pixel accuracy, a formula for calculating the pixel accuracy is as follows.

$$\text{Precision} = \frac{TP}{TP + FP}$$

Where TP denotes a number of pixels correctly predicted to be positive, and FP denotes a number of pixels incorrectly predicted to be positive.

In one embodiment of the present disclosure, the method further includes the following steps.

The segmented pictures in the semantic segmentation database are classified according to a scenario classification standard to obtain the scenario classification result for the segmented pictures.

A pre-constructed scenario recognition model is trained by utilizing the segmented pictures and the scenario classification result corresponding to the segmented pictures as training data to obtain the trained scenario recognition model, a GoogLeNet network is used as a main structure in the scenario recognition model.

In one embodiment of the present disclosure, the method further includes the following steps.

The channel measurement data in the training database are normalized.

A pre-constructed feature extraction and prediction network is trained by taking the segmented scenario pictures and the channel measurement data in a same scenario as training data. A trained feature extraction and prediction network is obtained by performing multiple rounds of training for different scenarios, five connected convolutional blocks including different numbers of 3×3 convolutional kernels are served as an image feature extraction structure of the feature extraction and prediction network, and five fully connected layers are connected to a last one of the five convolutional block, first four fully connected layers reduce a dimension of the extracted features, and a last one of the fully connected layers outputs a channel prediction result with a dimensionality of 1.

In one embodiment of the present disclosure, the normalizing of the channel measurement data in the training database includes the following steps.

The channel measurement data are normalized according to a Min-Max Normalization method, a formula is as follows.

$$X = \frac{x - x_{min}}{x_{max} - x_{min}}$$

Where X denotes normalized data, x denotes initial channel measurement data, $x_{min}$ denotes a minimum value for the channel measurement data, and $x_{max}$ denotes a maximum value for the channel measurement data.

The method for predicting the channel based on the image processing and the machine learning provided by the embodiments of the present disclosure is free from the limitations of the physical parameters in the traditional channel modeling and can complete the real-time prediction on the channel based on the scenario pictures. Compared with the traditional channel modeling, this method has the higher environmental adaptability, and can better cope with the requirements of the coverage for the multi-frequency bands and multi-scenarios in the 6G system. Meanwhile, compared with other prediction channel modeling based on the machine learning, the method introduces the semantic segmentation, which further extracts the images and weakens the impact of the non-scatterer parts on the channel prediction in the image, and achieves the better prediction effects. A mapping relationship between the physical environment and the channel characteristics is constructed in this method, which lays the foundation for further research on the environment-aware channel modeling.

The additional aspects and the advantages of the present disclosure will be set forth in part in the following descriptions, and some of the aspects and the advantages will be obvious from the description, or may be learned by the practice of the present disclosure.

BRIEF DESCRIPTION OF THE DRAWINGS

The above and/or additional aspects and advantages of the present disclosure will become apparent and readily understood from the following description of the embodiments with reference to the accompanying drawings, in which.

DETAILED DESCRIPTION OF THE EMBODIMENTS

Figure 1:
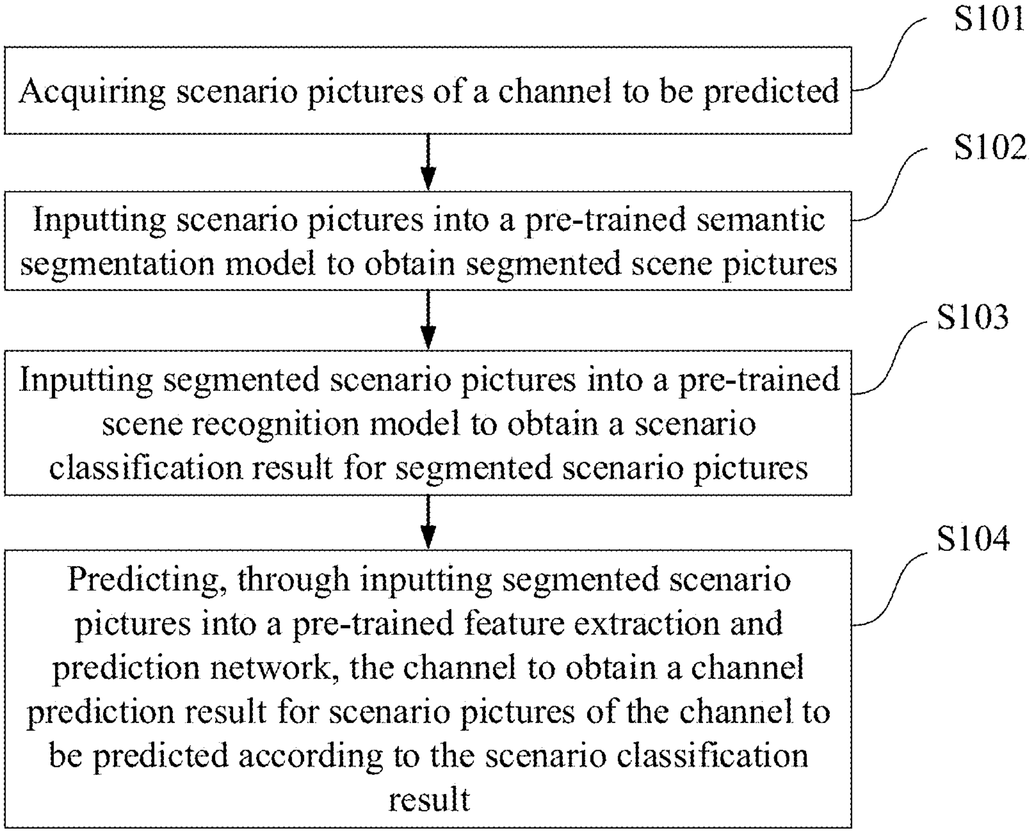
FIG. 1 illustrates a flow chart of a method for predicting a channel based on an image processing and a machine learning provided according to an embodiment of the present disclosure.

The embodiments of the present disclosure are described in detail below. The examples of the embodiments are illustrated in the accompanying drawings, in which the same or similar reference numerals throughout are represented the same or similar elements or elements with the same or similar functions. The embodiments described below with reference to the accompanying drawings are exemplary and are intended to explain the present disclosure, but cannot be understood as the limitations to the present disclosure.

FIG. 1 illustrates a flow chart of a method for predicting a channel based on an image processing and a machine learning according to an embodiment of the present disclosure.

As illustrated in FIG. 1, the method for predicting the channel based on the image processing and the machine learning includes the following steps.

In Step S101, scenario pictures of the channel to be predicted are acquired.

In the embodiments of the present disclosure, the methods for acquiring the scenario pictures of the channel are various, which is not limited to the specific acquisition method.

In Step S102, the scenario pictures are input into a pre-trained semantic segmentation model to obtain segmented scenario pictures.

For the scenario pictures of the channel to be predicted, the scenario pictures are input into the semantic segmentation model for annotating to obtain the scenario pictures with annotations.

Figure 2:
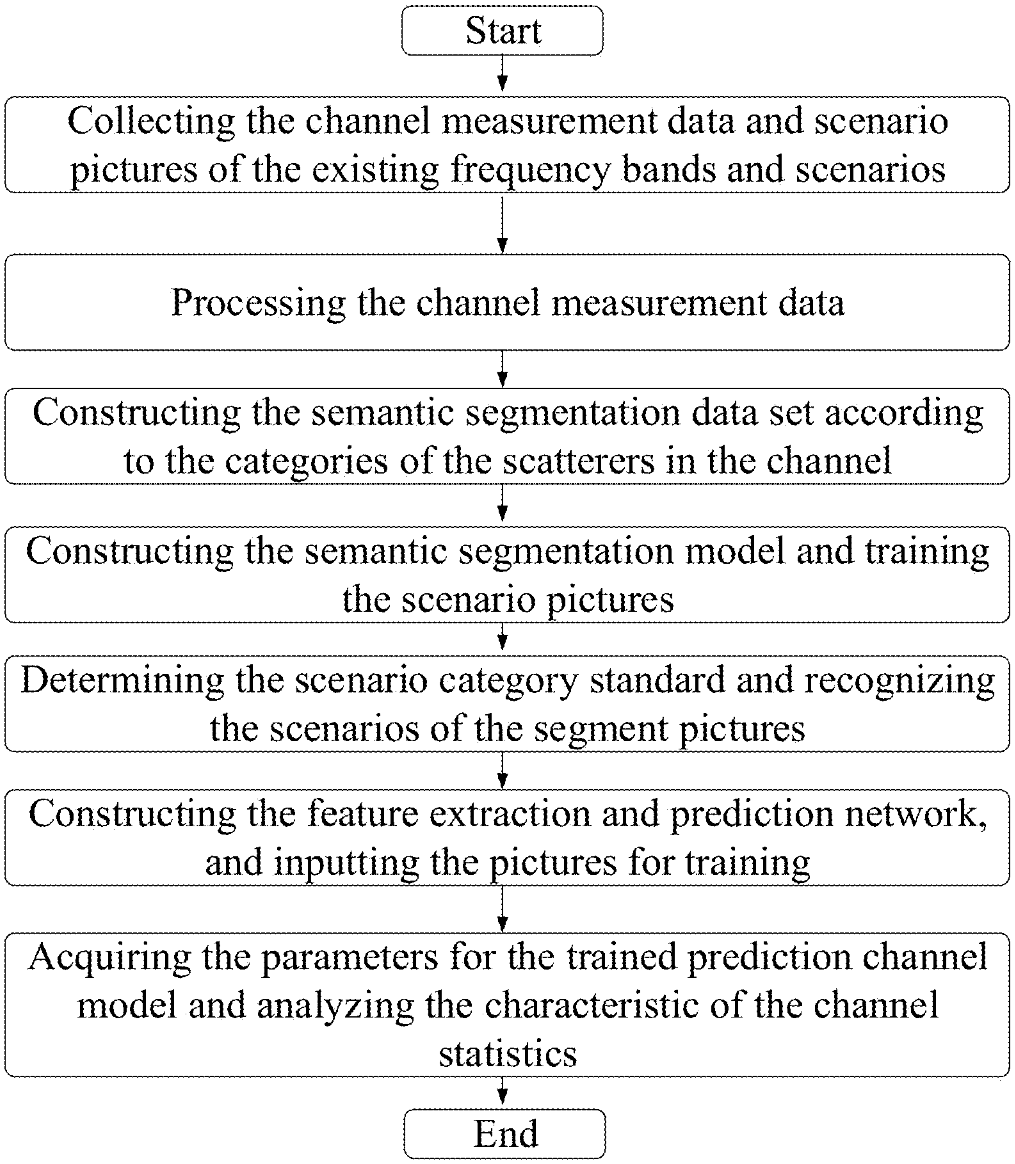
FIG. 2 illustrates a flow of a training for a channel prediction model provided according to an embodiment of the present disclosure.

In one embodiment of the present disclosure, the semantic segmentation model is trained in advance. As illustrated in FIG. 2, the specific training process is as follows. The channel measurement data and the scenario pictures of the existing frequency bands and scenarios are acquired, and the training database for the multi-frequency bands and multi-scenarios is constructed. The scenario pictures in the training database are annotated according to the categories of the scatterers in the channel to obtain a semantic segmentation data set. The pre-constructed semantic segmentation neural network is trained by utilizing the semantic segmentation data set to obtain a trained semantic segmentation model.

A training database for the channel measurement data and the scenario pictures/videos are constructed for the requirements of each scenario and frequency covered by the communication. During constructing the training database, various measurement devices and tools can be used, and the scenario picture/video database is used for analysis and optimization.

In a specific embodiment, the channel measurement environment is a part of a suburban scenario near a certain building. A receiver is placed at a fixed position in the building, and the transmitter is constantly changed with the scenario point positions. The measurement frequency is 3.7 GHz, and the data of a total of 8,392 sets are collected in six scenarios. Each set of the data is taken the building as an origin, the coordinates for each point position and the receiving power of the transceiver are recorded, so that the path loss of each point position is calculated, and the scenario picture is captured by the unmanned aerial vehicle at each point position.

The categories of the scatterers in channel can be divided according to the actual requirements. For example, the indoor scenarios can be divided into walls, ceilings, human bodies, furniture and so on, and the outdoor scenarios are more complex and diverse and can be divided into buildings, vegetation, various terrains and so on. The scenario pictures are annotated to generate the semantic segmentation data set according to the divided channel scatterer categories.

In the previous mentioned specific embodiment, the implementation scenarios mainly include trees and buildings. Therefore, as illustrated in Table 1, the implementation scenarios can be divided into six categories based on the tree density and the building cover.

TABLE 1

Classification standard of the image scenarios

| Scenario number | Classification standard |
|---|---|
| 1 | Low density of trees, without building obstructions |
| 2 | Medium density of trees, without building obstructions |

TABLE 1-continued

Classification standard of the image scenarios

| Scenario number | Classification standard |
|---|---|
| 3 | High density of trees, without building obstructions |
| 4 | Low density of trees, with building obstructions |
| 5 | Medium density of trees, with building obstructions |
| 6 | High density of trees, with building obstructions |

Further, the training the pre-constructed semantic segmentation neural network by utilizing the semantic segmentation data set to obtain the trained semantic segmentation model includes the followings.

A MobileNet V2 is utilized as a backbone network of an encoder to dilate a feature map from shallow to deep.

A DeepLabV3+ semantic segmentation neural network is constructed based on the MobileNet V2 backbone network, atrous convolutional layers with different dilation rates are selected to extract the features of different scales.

The semantic segmentation neural network is trained through the semantic segmentation data set to obtain the trained semantic segmentation model.

Figure 3:
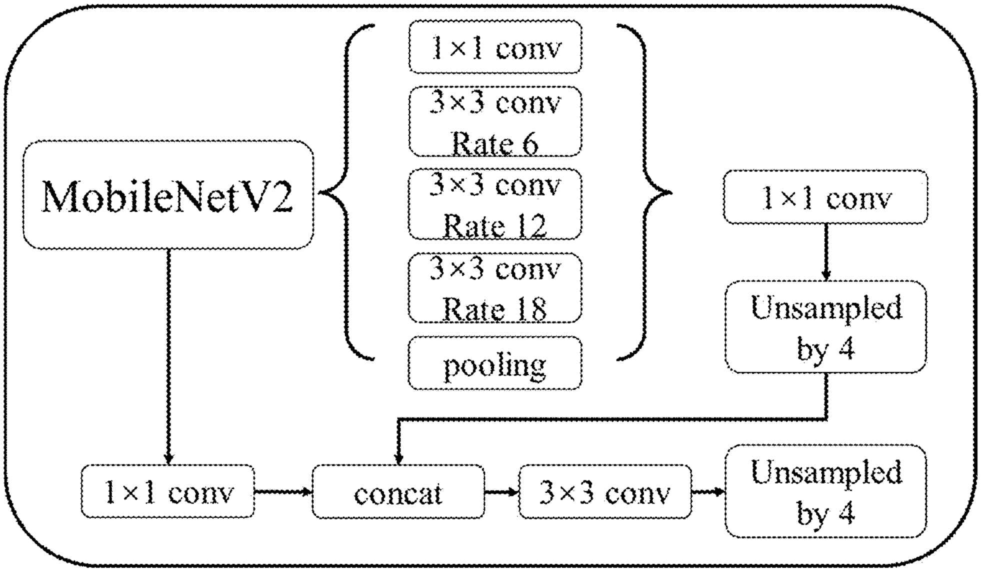
FIG. 3 illustrates a diagram of a structure of a semantic segmentation model provided according to an embodiment of the present disclosure.
Figure 4:
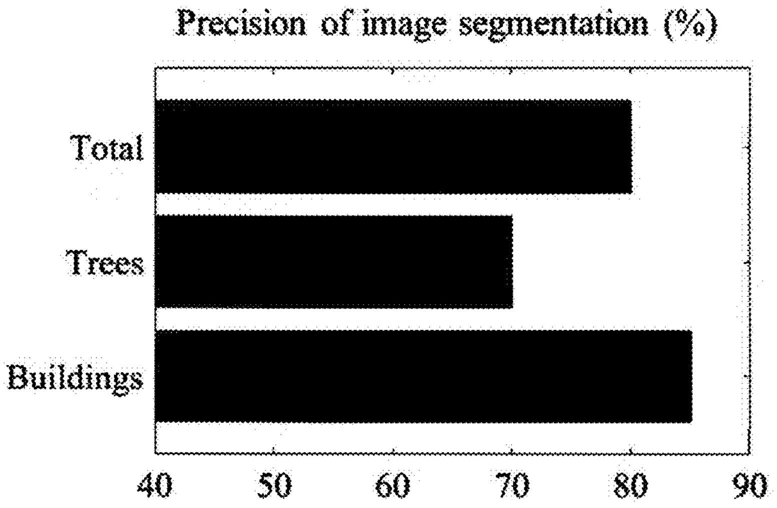
FIG. 4 illustrates a diagram of a result for an image semantic segmentation provided according to an embodiment of the present disclosure.

The structure of the semantic segmentation model is as illustrated in FIG. 3, and the result for the semantic segmentation is as illustrated in FIG. 4.

The features of different scales extracted by selecting atrous convolutional layers with different dilation rates are as follows.

$$f(x; w) = [f_0(x; w_0), f_1(x; w_1), \ldots, f_n(x; w_n)]$$

Where X denotes an image feature output form the MobileNetV2, W denotes a parameter set to be trained, $f_0$ denotes a 1×1 convolution layer without atrous convolution, $f_1$ to $f_n$ denote the convolution layers with different atrous convolution rates, in specifically, $f_1$ denotes a 3×3 convolution layer with a dilation convolution rate of 6, $f_2$ denotes a 3×3 convolution layer with a dilation convolution rate of 12, $f_3$ denotes a 3×3 convolution layer with a dilation convolution rate of 18. The dilation convolution rate can be modified according to the requirements. The performance of the model may be affected by modifying the dilation convolution rate, and the optimal combination of the dilation rates can be determined by the experiments.

In the trained semantic segmentation model, the segmentation accuracy of the semantic segmentation model is evaluated by the pixel accuracy, where a formula for calculating the pixel accuracy is as follows.

$$\text{Precision} = \frac{TP}{TP + FP}$$

Where TP denotes the number of pixels correctly predicted to be positive, and FP denotes the number of pixels incorrectly predicted to be positive. The higher the pixel accuracy, the higher the model accuracy.

In Step S103, the segmented scenario picture is input into the pre-trained scenario recognition model to obtain the scenario classification result for the segmented scenario picture.

In the embodiment of the present disclosure, the scenarios of the segment scenario picture are classified by utilizing the scenario recognition model. The scenario recognition model is constructed and trained in advance. The specific training process is as follows. The segmented pictures in the semantic segmentation database are classified according to the scenario classification standard to obtain the scenario classification results for the segmented pictures. The segmented pictures and the scenario classification results corresponding to the segmented pictures are taken as the training data to train the pre-constructed scenario recognition model to obtain a trained scenario recognition model, a GoogLeNet network is served as a main structure in the scenario recognition model.

In Step S104, according to the scenario classification results, the segmented scenario pictures are input into the pre-trained feature extraction and prediction network of channel prediction to obtain the channel prediction result for the scenario pictures of the channel to be predicted.

The segmented scenario pictures are input into the pre-trained feature extraction and prediction network of channel prediction after the categories of the segmented scenario pictures are determined. The feature extraction and prediction network is constructed and trained in advance, and the training data for the feature extraction and prediction network are the segmented scenario pictures of the known scenarios and the corresponding channel measurement data. The specific training process is as follows.

Firstly, the channel measurement data in the training database are normalized. As a specific implementation, the channel measurement data are normalized according to the Min-Max Normalization method. The normalization formula is as follows.

$$X = \frac{x - x_{min}}{x_{max} - x_{min}}$$

Where X denotes normalized data, X denotes initial channel measurement data, $x_{min}$ denotes a minimum value for the channel measurement data, and $x_{max}$ denotes a maximum value for the channel measurement data.

The Min-Max normalization is a commonly used data normalization method, which is utilized to scale the data to a specific range of [0,1]. This normalization method can facilitate the algorithm to converge faster and improve the accuracy and the stability of the algorithm. When the value ranges of the features are greatly different, the normalization can also prevent the certain features from having an excessive impact on the model, thereby improving the generalization performance of the model.

Secondly, based on the scenario classification results, the segmented scenario pictures and the channel measurement data for the same scenario are taken as the training data to train the pre-construct feature extraction and prediction network, and the trained feature extraction and prediction network is obtained by performing multiple rounds of training for different scenarios.

Figure 5:
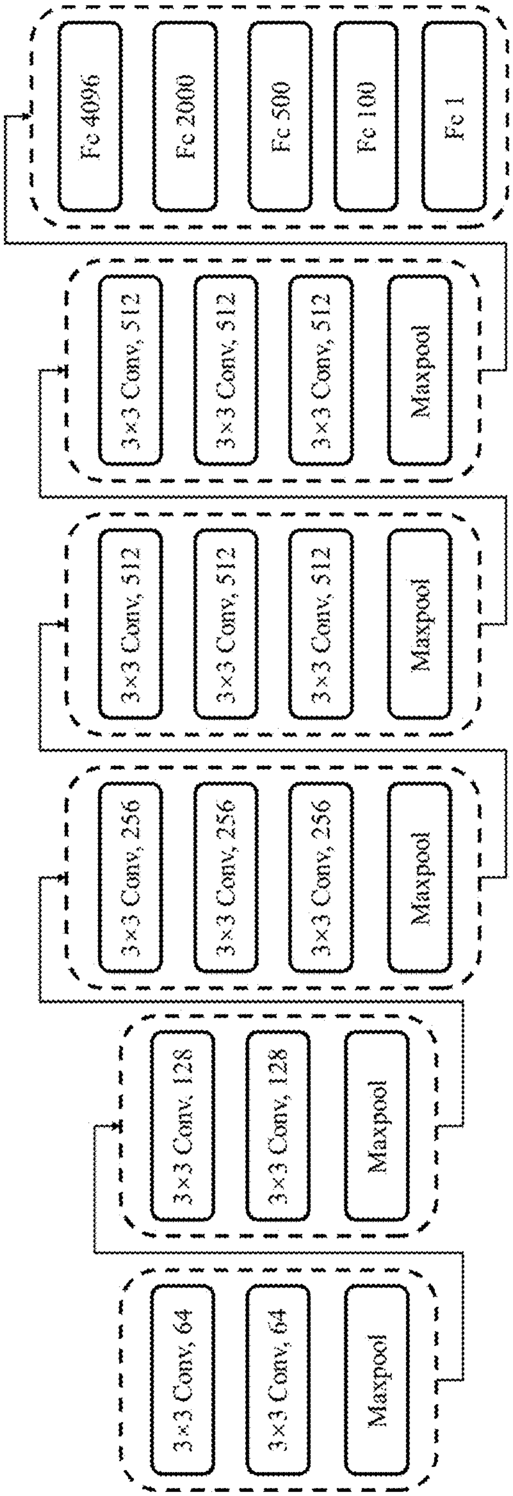
FIG. 5 illustrates a diagram of a structure of a feature extraction and prediction network provided according to an embodiment of the present disclosure.

As illustrated in FIG. 5, the five connected convolution blocks including different numbers of 3×3 convolution kernels are served as the image feature extraction structure in the feature extraction and prediction network. In the embodiments of the present disclosure, in order to reduce the training volume, the model parameters pre-trained in the Imagenet image data set are utilized to extract the features from the image. The pre-trained models are commonly trained on the large-scale data set, which has the strong feature extraction capability and the generalization capability, adapts to different data sets, and improves the migration ability of the model, reduces the training time and the number of the parameters for the model, and reduces the risk of the over-fitting.

The five fully connected layers are connected to the last convolution block. The first four fully connected layers reduce the dimension of the extracted features, and the last fully connected layer outputs a channel prediction result with a dimension of 1. The weight of the prediction network is updated by the Adam optimizer, which performs better in the larger data sets. The activation function is ReLU, and the output nodes of the five fully connected layers are 4096, 2000, 500, 100, and 1, respectively. The parameters for the feature extraction and prediction network are as illustrated in Table 2.

TABLE 2

| Settings for the structure of the feature extraction and prediction network | |
|---|---|
| Convolutional layer | 3 × 3 convolution kernel of a number of 64 |
| Convolutional layer | 3 × 3 convolution kernel of a number of 64 |
| Maximum pooling layer with a stride of 2 | |
| Convolutional layer | 3 × 3 convolution kernel of a number of 128 |
| Convolutional layer | 3 × 3 convolution kernel of a number of 128 |
| Maximum pooling layer with a stride of 2 | |
| Convolutional layer | 3 × 3 convolution kernel of a number of 256 |
| Convolutional layer | 3 × 3 convolution kernel of a number of 256 |
| Convolutional layer | 3 × 3 convolution kernel of a number of 256 |
| Maximum pooling layer with a stride of 2 | |
| Convolutional layer | 3 × 3 convolution kernel of a number of 512 |
| Convolutional layer | 3 × 3 convolution kernel of a number of 512 |
| Convolutional layer | 3 × 3 convolution kernel of a number of 512 |
| Maximum pooling layer with a stride of 2 | |
| Convolutional layer | 3 × 3 convolution kernel of a number of 512 |
| Convolutional layer | 3 × 3 convolution kernel of a number of 512 |
| Convolutional layer | 3 × 3 convolution kernel of a number of 512 |
| Maximum pooling layer with a stride of 2 | |
| Fully connected layer | Neurons of a number of 4,096 |
| Fully connected layer | Neurons of a number of 2,000 |
| Fully connected layer | Neurons of a number of 500 |
| Fully connected layer | Neurons of a number of 100 |
| Fully connected layer | Neurons of a number of 1 |

The segmented pictures in the same scenario are input into the constructed feature extraction and prediction network of training until the model is converged. The pictures in the same scenario have the similar environmental characteristics. The feature extraction and the prediction channel modeling are further performed on the pictures in the same scenario, which is benefit for perceiving more environmental details in the same training volume. For different scenarios, the above mentioned process is repeated to obtain the parameters for the prediction channel model in different scenarios.

Figure 6:
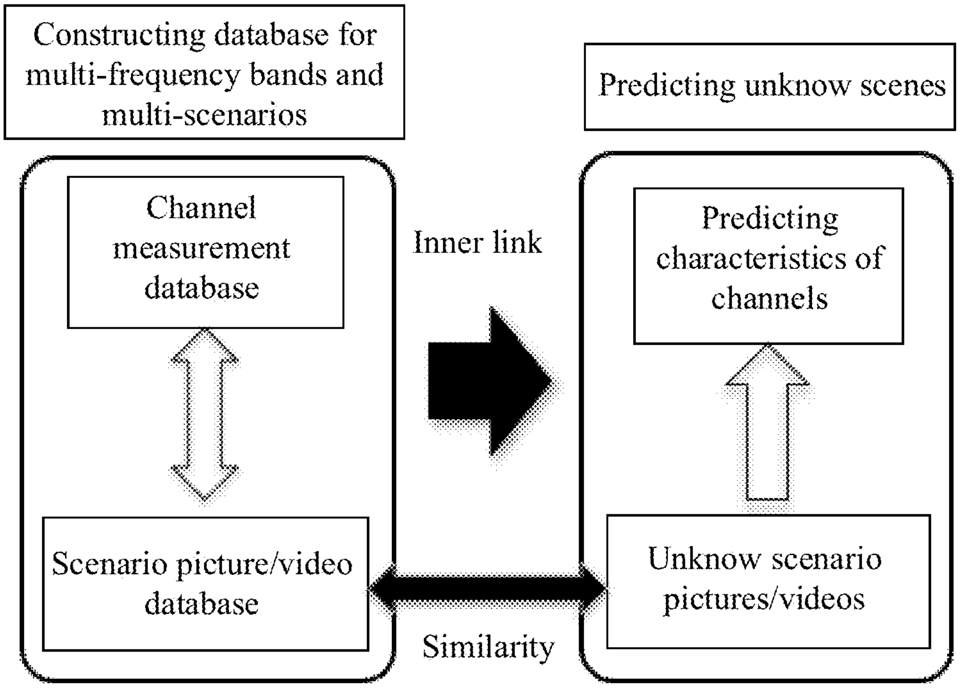
FIG. 6 illustrates an application flow of a prediction channel modeling based on a multi-modal database provided according to an embodiment of the present disclosure.
Figure 7:
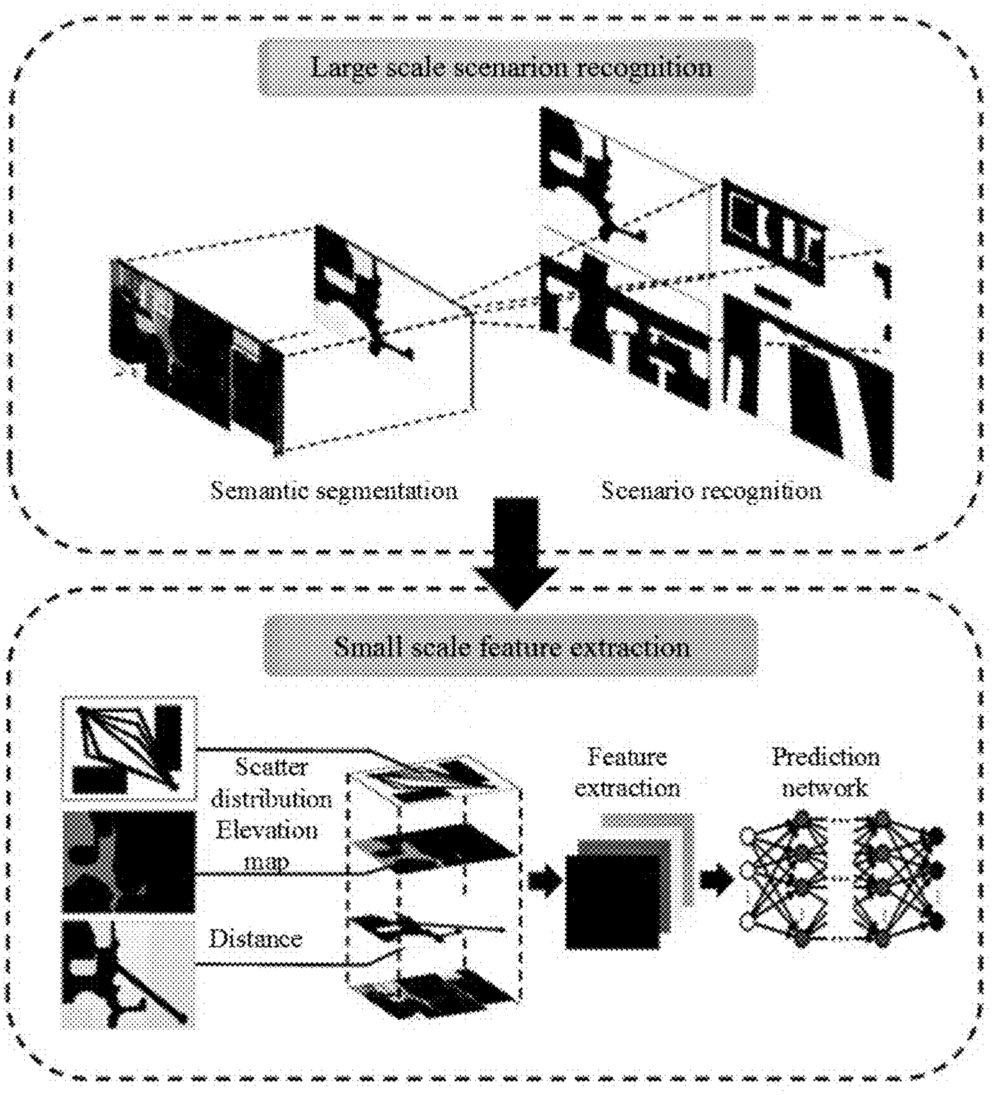
FIG. 7 illustrates a schematic flowchart of an image processing and a machine learning algorithm provided according to an embodiment of the present disclosure.
Figure 8:
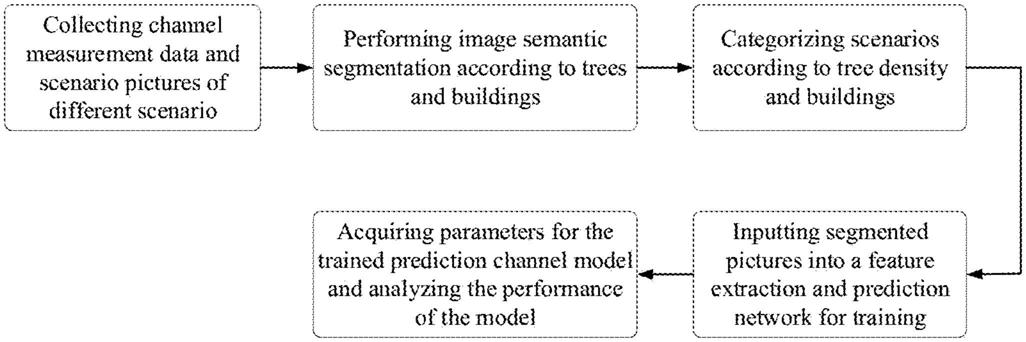
FIG. 8 illustrates a simulation flowchart of the applied prediction channel modeling provided according to an embodiment of the present disclosure.

In the embodiments of the present disclosure, the prediction channel model can be divided into three parts of a semantic segmentation model, a scenario recognition model as well as a feature extraction and prediction network. The image semantic segmentation technology is introduced to identify and segment the scatterers in the environment and extract the effective position information of the scatterers. The pictures are segmented into different scenarios according to the segmented results to input into the model for scenario recognition, and the subsequent feature extraction is performed in the similar scenario through the scenario recognition, which facilitates extracting the tinier environmental features. The semantic segmentation images in the same scenario are jointly input into the feature extraction network to complete the training of the prediction channel model. The channel prediction of the unknown scenarios can be implemented through the pre-trained prediction channel model. As illustrated in FIG. 6, FIG. 7 and FIG. 8, the performance of the prediction channel model can be analyzed after the parameters for the trained prediction channel model are obtained. Specifically, in the embodiments of the present disclosure, the accuracy of the channel prediction is analyzed by utilizing the path loss obtained by the prediction channel model and the path loss of the channel measurement data, and the performances of the 3GPP Uma model and the channel prediction modeling without image processing are compared in this experimental scenario. The simulation results are as illustrated in FIG. 3, which illustrates the comparison among the performances of the prediction channel modeling, the 3GPP Uma model and the image prediction channel modeling without semantic segmentation. It can be seen from the simulation results that the performance of the prediction channel modeling method based on the image processing and the machine learning far exceeds that of the 3GPP Uma model in the experimental scenario. Since the image semantic segmentation is added into the algorithm, the functions of the scatterers that affect the channel are strengthened in the channel prediction. Therefore, the performance of the prediction channel modeling method based on the image processing and the machine learning is superior to that of the channel prediction without image processing.

TABLE 3

Simulation results

| Channel modeling method | Evaluation Index | | |
|---|---|---|---|
| | RMSE (dB) | MAE(dB) | MAPE (%) |
| 3GPP Uma path loss model | 0.198 | 0.167 | 16.7 |
| Channel modeling without image semantic segmentation | 0.074 | 0.056 | 12.1 |
| Prediction channel modeling based on image processing and machine learning | 0.058 | 0.044 | 8.7 |

According to the channel prediction method based on the image processing and the machine learning proposed by the embodiments of the present disclosure, the semantic segmentation technology is introduced, which can input the environmental information more flexibly, thereby improving the accuracy of the model, ultimately achieving the higher accuracy than the traditional channel model, facilitating satisfying the technical requirements of full coverage for the multi-frequency bands and multi-scenarios in 6G system better, solving the problems of the parameter limitations of the traditional channel modeling as well as the high costs and the high difficulty of the channel measurements, implementing the real-time prediction of the channel based on the scenario images, having the high environmental adaptability, and having the reference value for the design of the channel modeling algorithms based on the environment awareness in the model.

In the descriptions of this specification, the descriptions of the reference terms such as "one embodiment," "some embodiments," "an example," "specific examples," or "some examples" are intended to mean that the specific features, structures, materials, or characteristics described with reference to the embodiment or example are included in at least one embodiment or example in the present disclosure. In this specification, the illustrative expressions of the above terms are not necessarily directed to the same embodiment or example. Furthermore, the described specific features, structures, materials or characteristics can be combined in an arbitrary suitable manner in an arbitrary or N embodiments or examples. In addition, those skilled in the art can combine the different embodiments or examples and combine the features of the different embodiments or examples described in this specification without conflicting with each other.

In addition, the terms "first" and "second" are merely used for the purpose of description, but cannot be understood as indicating or implying the relative importance or implicitly indicating the quantity of the indicated technical features. Therefore, the features defined with "first" and "second" may explicitly or implicitly include at least one of these features. In the description of the present disclosure, unless otherwise clearly and specifically limited, "N" means at least two, such as two, three and the like.

An arbitrary process or method descriptions in flowcharts or otherwise described herein may be understood to represent including the modules, segments or portions of one or N codes of the executable instructions of the steps for implementing the customized functions or processes. And the scope of the preferred embodiments of the present disclosure includes the additional implementations in which functions may be performed out of the order shown or discussed, including in a substantially simultaneous manner or in the reverse order, depending on the functions involved, which should be interpreted as the embodiments of the present disclosure understood by those skilled in the art.

What is claimed is:

1. A method for predicting a channel based on an image processing and a machine learning, comprising following steps:

acquiring scenario pictures of the channel to be predicted;

inputting the scenario pictures into a pre-trained semantic segmentation model to obtain segmented scenario pictures;

inputting the segmented scenario pictures into a pre-trained scenario recognition model to obtain a scenario classification result for the segmented scenario pictures;

predicting, through inputting the segmented scenario pictures into a pre-trained feature extraction and prediction network, the channel to obtain a channel prediction result for the scenario pictures of the channel to be predicted according to the scenario classification result;

acquiring channel measurement data and scenario pictures of existing frequency bands and scenarios, and constructing a training database for multi-frequency bands and multi-scenarios; and annotating, according to categories of scatterers in the channel, the scenario pictures in the training data base to obtain a semantic segmentation data set; training, by utilizing the semantic segmentation data set, a pre-constructed semantic segmentation neural network to obtain a trained semantic segmentation model.

2. The method according to claim 1, wherein the training the pre-constructed semantic segmentation neural network by utilizing the semantic segmentation data set to obtain the trained semantic segmentation model includes following steps:

dilating, by utilizing a MobileNet V2 as a backbone network of an encoder, a feature map from shallow to deep;

constructing a DeepLabV3+ semantic segmentation neural network based on the MobileNetV2 backbone network, wherein atrous convolutional layers with different dilation rates are selected to extract features of different scales; and training, through the semantic segmentation data set, the semantic segmentation neural network to obtain the trained semantic segmentation model.

3. The method according to claim 2, wherein in the trained semantic segmentation model, an segmentation accuracy of the semantic segmentation model is evaluated by a pixel accuracy, wherein a formula for calculating the pixel accuracy is:

$$\text{Precision} = \frac{TP}{TP + FP}$$

where TP denotes a number of pixels correctly predicted to be positive, and FP denotes a number of pixels incorrectly predicted to be positive.

4. The method according to claim 1, further including following steps:

classifying, according to a scenario classification standard, the segmented pictures in the semantic segmentation database to obtain the scenario classification result for the segmented pictures; and training, by utilizing the segmented pictures and the scenario classification result corresponding to the segmented pictures as training data, a pre-constructed scenario recognition model to obtain the trained scenario recognition model, wherein a GoogLeNet network is used as a main structure in the scenario recognition model.

5. The method according to claim 1, further including:

normalizing the channel measurement data in the training database; and training, by taking the segmented scenario pictures and the channel measurement data in a same scenario as training data, a pre-constructed feature extraction and prediction network, training for multiple rounds for different scenarios to obtain a trained feature extraction and prediction network, wherein five connected convolutional blocks including different numbers of 3×3 convolutional kernels are served as an image feature extraction structure of the feature extraction and prediction network, and five fully connected layers are connected to a last one of the five convolutional block, wherein first four fully connected layers reduce a dimension of the extracted features, and a last one of the fully connected layers outputs a channel prediction result with a dimensionality of 1.

6. The method according to claim 5, where the normalizing the channel measurement data in the training database includes following steps:

normalizing, according to a Min-Max Normalization method, the channel measurement data, wherein a formula is:

$$X = \frac{x - x_{min}}{x_{max} - x_{min}}$$

where X denotes normalized data, x denotes initial channel measurement data, $x_{min}$ denotes a minimum value for the channel measurement data, and $x_{max}$ denotes a maximum value for the channel measurement data.

* * * * *